United States Patent
Hong et al.

(10) Patent No.: US 12,069,732 B2
(45) Date of Patent: Aug. 20, 2024

(54) RANDOM ACCESS METHOD AND APPARATUS, AND STORAGE MEDIUM

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Wei Hong, Beijing (CN); Yajun Zhu, Beijing (CN); Junli Li, Beijing (CN); Yong Li, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 378 days.

(21) Appl. No.: 17/423,474

(22) PCT Filed: Jan. 18, 2019

(86) PCT No.: PCT/CN2019/072430
§ 371 (c)(1),
(2) Date: Jul. 15, 2021

(87) PCT Pub. No.: WO2020/147130
PCT Pub. Date: Jul. 23, 2020

(65) Prior Publication Data
US 2022/0078851 A1    Mar. 10, 2022

(51) Int. Cl.
*H04W 74/0833* (2024.01)
*H04W 16/14* (2009.01)
*H04W 74/0808* (2024.01)

(52) U.S. Cl.
CPC ....... *H04W 74/0833* (2013.01); *H04W 16/14* (2013.01); *H04W 74/0808* (2013.01)

(58) Field of Classification Search
CPC ............. H04W 74/0833; H04W 16/14; H04W 74/0808; H04W 8/26; H04W 76/11; H04L 5/0053
See application file for complete search history.

(56) References Cited

U.S. PATENT DOCUMENTS

2012/0093109 A1*  4/2012  Dong ................... H04W 74/008
                                                        370/329
2012/0320842 A1*  12/2012  Jeong ................... H04W 74/006
                                                         370/329

(Continued)

FOREIGN PATENT DOCUMENTS

CN        105828450 A        8/2016
CN        106576302 A        4/2017

(Continued)

OTHER PUBLICATIONS

International Search Report of PCT Application No. PCT/CN2019/072430 dated Oct. 9, 2019 with English translation (4p).

(Continued)

*Primary Examiner* — Ashley Shivers
(74) *Attorney, Agent, or Firm* — Arch & Lake LLP

(57) ABSTRACT

A random access method and a device thereof are provided. The method includes that a base station receives a random access preamble and sends a Random Access Response (RAR) according to the random access preamble, where the RAR indicates at least two time-frequency units, and the at least two time-frequency units are time-frequency units having different time domains on an unlicensed channel. Further, the base station receives a first random access message 3 (MSG3) sent on a first time-frequency unit by a first terminal and sends a first random access message 4

(Continued)

(MSG4) to the first terminal, where the first time-frequency unit is any one of the at least two time-frequency units, where the first MSG3 includes a terminal identifier of the first terminal, where the first MSG4 carries a terminal identifier of the first terminal and a first Cell-Radio Network Temporary Identifier allocated to the first terminal.

18 Claims, 18 Drawing Sheets

(56) References Cited

U.S. PATENT DOCUMENTS

| | | | |
|---|---|---|---|
| 2016/0050667 | A1 | 2/2016 | Papasakellariou et al. |
| 2016/0073292 | A1* | 3/2016 | Fan .................. H04W 74/0833 370/230 |
| 2016/0227575 | A1* | 8/2016 | Furuskog .............. H04W 72/23 |
| 2017/0048889 | A1 | 2/2017 | Kadous et al. |
| 2017/0215207 | A1 | 7/2017 | Yi et al. |
| 2017/0231011 | A1* | 8/2017 | Park .................. H04W 72/0446 |
| 2018/0220423 | A1* | 8/2018 | Ly ..................... H04W 72/0453 |
| 2018/0351704 | A1 | 12/2018 | Papasakellariou et al. |
| 2019/0141742 | A1* | 5/2019 | Zhou .................... H04L 5/0064 |
| 2019/0215864 | A1 | 7/2019 | Yang et al. |
| 2019/0261255 | A1 | 8/2019 | You |
| 2020/0146071 | A1* | 5/2020 | Yerramalli ............ H04W 76/11 |
| 2020/0245364 | A1* | 7/2020 | Kim .................. H04W 74/004 |
| 2020/0305204 | A1* | 9/2020 | Shi ..................... H04W 72/046 |
| 2021/0274555 | A1* | 9/2021 | Alfarhan ............... H04W 72/23 |

FOREIGN PATENT DOCUMENTS

| | | |
|---|---|---|
| CN | 107371273 A | 11/2017 |
| CN | 107466113 A | 12/2017 |
| CN | 107926048 A | 4/2018 |
| CN | 108024310 A | 5/2018 |
| WO | 2017125049 A1 | 7/2017 |
| WO | 2017135803 A1 | 8/2017 |

OTHER PUBLICATIONS

LG Electronics, "Initial access and mobility for NR unlicensed operation", 3GPP TSG RAN WG1 Meeting #93 R1-1806646 Busan, Korea, May 21-25, 2018, (5p).

English translation of the Written Opinion of the International Search Authority in the international application No. PCT/CN2019/072430, mailed on Oct. 9, 2019 (4p).

First Office Action of the Chinese Application No. 201980000076.5, issued on Apr. 27, 2022 with English translation, (17p).

Supplementary European Search Report in the European Application No. 19910027.2 mailed on Jun. 27, 2022, (11p).

VIVO, "Enhanced RACH and Additional Transmission Opportunities", 3GPP TSG-RAN WG2 Meeting #103bis, R2-1814262, Chengdu, China, Oct. 8-12, 2018, (5p).

LG Electronics, "Initial Access and Mobility for NR-U", 3GPP TSG RAN WG1 Ad-Hoc Meeting 1901, R1-1900607, Taipei, Taiwan, Jan. 21-25, 2019, (19p).

Huawei, Hisilicon, "Random Access in NR Unlicensed", 3GPP TSG RAN WG1 Meeting #92bis, R1-1803681, Sanya, China, Apr. 16-20, 2018, (6p).

* cited by examiner

RANDOM ACCESS METHOD AND APPARATUS, AND STORAGE MEDIUM

This application is the U.S. national phase application of International Application No. PCT/CN2019/072430, filed on Jan. 18, 2019, the entire contents of which are incorporated herein by reference for all purposes.

TECHNICAL FIELD

The present disclosure relates to the field of wireless communication technologies, and in particular, to a method and device for random access, and a storage medium.

BACKGROUND

In response to the growing communication demands for mobile data, it is proposed in the art to extend the application of cellular mobile communication technologies to unlicensed frequency bands. That is, research on a New Radio Based Unlicensed Access (NR-U) is proposed.

In the related art, it is necessary to introduce a Listen Before Talk (LBT) mechanism, so that the NR-U access technologies in radio communication systems can coexist fairly with other different radio access technologies. However, there is no perfect solution at present regarding how to realize the NR-U-based random access in the LBT mechanism.

SUMMARY

The present disclosure provides a method and device for random access, and a storage medium. The technical solution is described as follows.

According to a first aspect of the present disclosure, a method for random access is provided, which is executed by a base station. The method includes that the base station receives a random access preamble and sends a Random Access Response (RAR) according to the received random access preamble, where the RAR includes resource indication information indicating at least two time-frequency units, and the at least two time-frequency units are different time-frequency units in time domain on an unlicensed channel.

Further, the base station receives a first random access message 3 (MSG3) sent by a first terminal on a first time-frequency unit, where the first time-frequency unit is any one of the at least two time-frequency units, and the first MSG3 includes a terminal identifier of the first terminal.

Moreover, the base station sends a first random access message 4 (MSG4) to the first terminal, where the first MSG4 carries the terminal identifier of the first terminal and a first Cell-Radio Network Temporary Identifier (C-RNTI) allocated to the first terminal.

According to a second aspect of the present disclosure, a method for random access is provided, which is executed by a terminal. The method includes that the terminal sends a random access preamble to a base station and receives a random access response RAR sent by the base station, where the RAR includes resource indication information indicating at least two time-frequency units, and the at least two time-frequency units are different time-frequency units in time domain on an unlicensed channel.

Further, the method includes that the terminal sends a first MSG3 to the base station on a first time-frequency unit, where the first time-frequency unit is any one of the at least two time-frequency units and the first MSG3 includes a terminal identifier of the terminal.

Moreover, the method includes that the terminal receives a first MSG4 sent by the base station, where the first MSG4 carries the terminal identifier of the terminal and a first C-RNTI allocated by the base station to the first terminal.

According to a third aspect of the present disclosure, a device for random access is provided, which may be applied to a base station. The device includes a processor and a memory having stored thereon processor-executable instructions.

Further, the processor is configured to: receive a random access preamble: and send, according to the received random access preamble, a random access response RAR, where the RAR includes resource indication information indicating at least two time-frequency units, and the at least two time-frequency units are different time-frequency units in time domain on an unlicensed channel.

Moreover, the processor is configured to receive a first MSG3 sent by a first terminal on a first time-frequency unit, where the first time-frequency unit is any one of the at least two time-frequency units, and the first MSG3 includes a terminal identifier of the first terminal. Furthermore, the processor is configured to send a first MSG4 to the first terminal, where the first MSG4 carries the terminal identifier of the first terminal and a first C-RNTI allocated to the first terminal.

According to a fourth aspect of the present disclosure, a device for random access is provided, which may be applied to a first terminal and include a processor and a memory having stored thereon processor-executable instructions.

Further, the processor is configured to implement the method for random access in the second aspect of the embodiments of the present disclosure.

It is to be understood that the foregoing general description and the following detailed description are only exemplary and are not restrictive of the disclosure.

BRIEF DESCRIPTION OF THE DRAWINGS

The accompanying drawings herein are incorporated into the specification and constitute part of the specification, illustrate embodiments conforming to the disclosure and explain the principles of the disclosure together with the specification.

DETAILED DESCRIPTION

Figure 1:
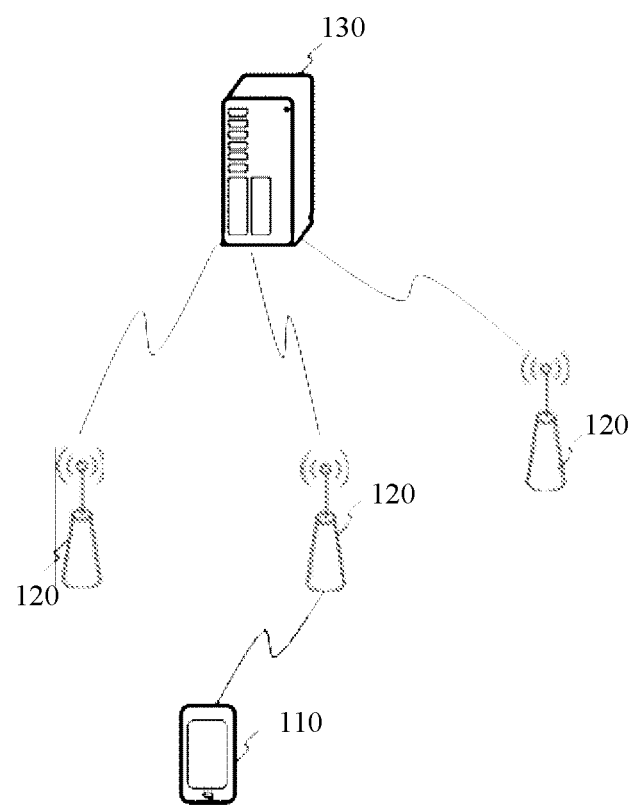
FIG. 1 is a schematic structural diagram of a radio communication system according to some exemplary embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

It is to be understood that the expression "several" mentioned herein refers to one or more, and "multiple" refers to two or more. The expression "and/or" describes the association relationship of the associated object, indicating that there may be three relationships. For example, A and/or B, which may indicate the following three situations: A exists alone, both A and B exist, and B exists alone. The character "/" generally indicates that there is an "or" relationship between the front object and the rear object.

The radio spectrum resources are limited and non-renewable natural resources. Therefore, each country has a special management organization for the radio spectrum, which issues special policies and regulations to realize the unified planning and management of the radio spectrum. At present, most of the spectrum management in various countries adopt a fixed spectrum allocation strategy, that is, spectrum resources are managed by government authorities and allocated to fixed authorized users. In this way, it can ensure that excessive mutual interference between users is avoided, and spectrum resources are better utilized. At present, spectrum resources can be divided into a licensed spectrum and an unlicensed spectrum.

The licensed spectrum is strictly restricted and protected, and only licensed users and devices thereof conforming to the specification are allowed to access to the licensed spectrum, and users usually have to pay for it. At present, important departments such as public security, railways, civil aviation, radio and television, and telecommunications all have a certain licensed spectrum, and the communication of equipment in these departments is performed on the licensed spectrum, especially in the telecommunications industry. The mobile phones we use every day communicate through the licensed spectrum owned by the operators. Each major operator has a dedicated frequency band authorized by a radio management organization or department in each country, so as to ensure that public mobile communications are not interfered.

The unlicensed spectrum is a spectrum which can be accessed and used by devices that meet certain specifications and standards, and on which it is ensured that no interference is caused to other users. Typically, communication technologies such as Wireless Fidelity (Wi-Fi) and Bluetooth (BT) are transmitted through the unlicensed spectrum. In addition, the International Telecommunication Union-Radio Communication Bureau has defined the Industrial Scientific Medical (ISM) frequency band opened for industrial, scientific, and medical organizations, on which no authorization is required, but of course, a transmission power conforms to a requirement, and interference to other frequency bands is avoided.

With the growing communication demands for mobile data, research has been carried out in the art to extend cellular mobile communication technologies to unlicensed frequency bands. For example, in order to extend the Fifth-generation (5G) technology, also known as the new radio (NR) technology, to the unlicensed frequency bands, the 3rd Generation Partnership Project (3GPP) organization has adopted the 5G research project "Study on NR-based Access to Unlicensed Spectrum" (NR-U for short), which aims to enable the NR to meet the regulatory requirements of the unlicensed frequency bands and to ensure peaceful coexistence with other access technologies operating on the unlicensed frequency bands.

The embodiments of the present disclosure provide a random access solution based on the NR-U research, which can be applied into a radio communication system to implement connection between a terminal and a base station.

Referring to FIG. 1, which is a schematic structural diagram of a radio communication system according to some exemplary embodiments, as shown in FIG. 1, a mobile communication system is a cellular mobile communication technology-based communication system, the mobile communication system may include several terminals 110 and several base stations 120.

Herein, the terminal 110 may be a device that provides voice and/or data connectivity to a user. The terminal 110 may communicate with one or more core networks via a Radio Access Network (RAN). The terminal 110 may be an Internet of Things (IoT) terminal such as a sensor device, a mobile phone (or referred to as a "cellular" phone), and a computer having an lot terminal. For example, the terminal may be a fixed, portable, pocket-sized, handheld, computer-built-in, or vehicle-mounted device, for example, a Station (STA), a subscriber unit, a subscriber station, a mobile station, a mobile, a remote station, an access point, a remote terminal, an access terminal, a user terminal, a user agent, a user device, or user equipment (UE). Alternatively, the terminal 110 may be an unmanned aerial vehicle device.

The base station 120 may be a network side device in a radio communication system. Herein, the radio communication system may be a 4th generation mobile communication (4G) system which is also referred to as a Long Term Evolution (LTE) system. Alternatively, the radio communication system may be a 5G system, which is also referred to as a new radio (NR) system. Alternatively, the radio communication system may be a next generation system of the 5G system.

Herein, the base station 120 may be an evolved NodeB (eNB) used in a 4G system. Alternatively, the base station 120 may be a base station (gNB) having a centralized-distributed architecture in the 5G system. When the base station 120 adopts a centralized-distributed architecture, the base station typically includes a central unit (CU) and at least two distributed units (DUs). Protocol stacks of a Packet Data Convergence Protocol (PDCP) layer, a Radio Link Control (RLC) layer, and a Media Access Control (MAC) layer are set in the central unit. A protocol stack of a Physical (PHY) layer is set in the distributed unit, and the specific implementation of the base station 120 is not limited in the embodiments of the present disclosure.

A wireless connection may be established between the base station 120 and the terminal 110 through a radio air interface. In various embodiments, the radio air interface is a radio air interface based on the 4G standard; Alternatively, the radio air interface is a radio air interface based on the 5G standard. For example, the radio air interface is the New Radio; Alternatively, the radio air interface may be a radio air interface based on the next generation mobile communication network technical standard of 5G.

Alternatively, the radio communication system may further include a network management device 130.

Several base stations 120 are each connected to the network management device 130. Herein the network management device 130 may be a core network device in a radio communication system. For example, the network management device 130 may be a Mobility Management Entity (MME) in an Evolved Packet Core (EPC). Alternatively, the network management device may be other core network devices, such as a Serving GateWay (SGW), a Public Data Network GateWay (PGW), a Policy and Charging Rules Function (PCRF), or a Home Subscriber Server (HSS). The implementation of the network management device 130 is not limited by the embodiments of the present disclosure.

Figure 2:
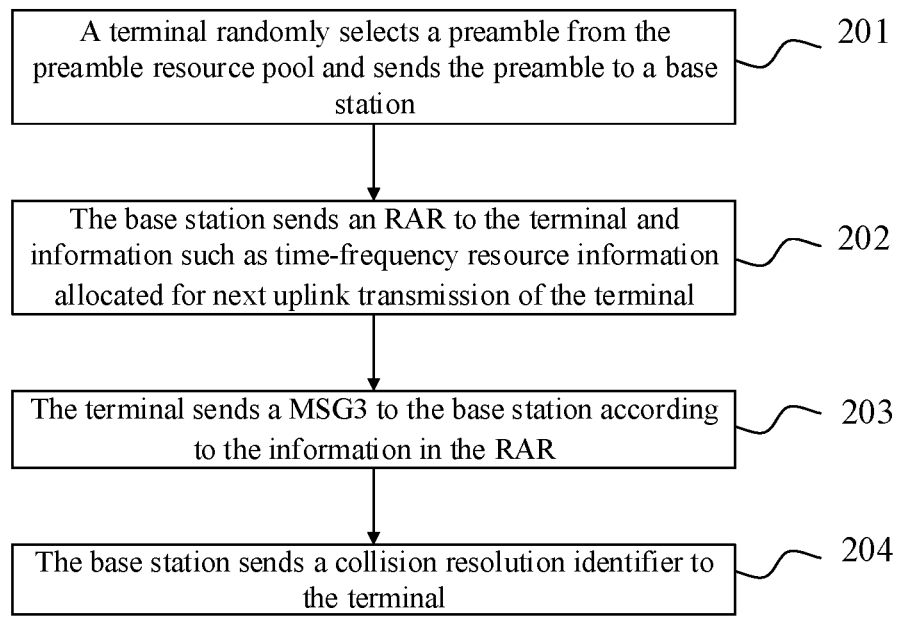
FIG. 2 is a schematic diagram of a random access process according to an embodiment of the present disclosure.

In a possible implementation, the terminal and the base station in the radio communication system described above may have a capability (such as a NR-U capability) of using an unlicensed frequency band based on the cellular mobile communication technology. Accordingly, a terminal having a capability of using an unlicensed frequency band based on the cellular mobile communication technology may initiate, on the unlicensed frequency band, a random access request to a base station having the same capability. Referring to FIG. 2, a schematic diagram of a random access process according to an embodiment of the present disclosure is shown. As shown in FIG. 2, operations 201 to 204 are included.

At 201, a terminal randomly selects a preamble from a preamble resource pool and sends the preamble to a base station. A message including the preamble is also referred to as a random access message 1 (MSG1). The base station performs correlation detection on a received signal to identify the preamble sent by the user.

At 202, the base station sends a Random Access Response (RAR) to the terminal. The RAR is also referred to as a random access message 2 (MSG2). The RAR includes information such as a random access preamble identifier, a timing advance instruction determined according to estimation for a delay between the terminal and the base station, a Temporary Cell-Radio Network Temporary Identifier (TC-RNTI), and a time-frequency resource allocated for the next uplink transmission of the terminal.

At 203, the terminal sends a random access message 3 (MSG3) to the base station according to the information in the RAR. The MSG3 includes information such as a terminal identifier and a Radio Resource Control (RRC) link request. The terminal identifier may be a unique identifier of the terminal. For example, when the terminal is in an idle state, the terminal identifier may be an International Mobile Subscriber Identification Number (IMSI) of the terminal. When the terminal is in a connected state, the terminal identifier may be an allocated Cell-Radio Network Temporary Identifier (C-RNTI) to the terminal.

At 204, the base station sends a collision resolution identifier (also referred to as MSG4) to the terminal. The collision resolution identifier includes an identifier of a terminal winning in the collision resolution. After the terminal detects its own identifier, and if the terminal is in an idle state, the terminal upgrades the TC-RNTI to the C-RNTI, sends an acknowledgement (ACK) signal to the base station, completes a random access procedure, and waits for scheduling of the base station.

Figure 3:
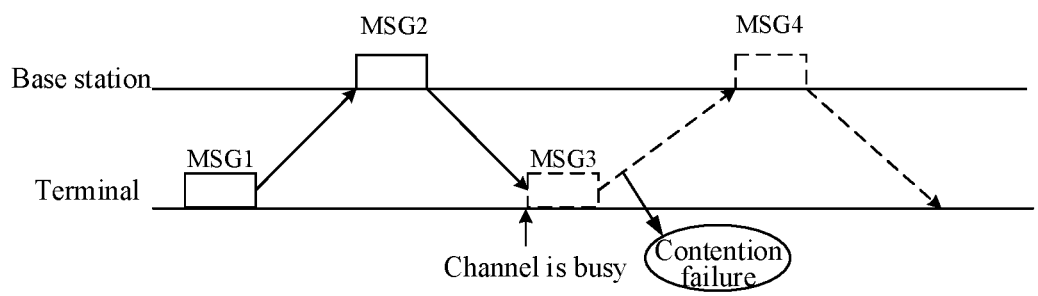
FIG. 3 is a schematic diagram of a random access failure of a terminal caused by a failure of LBT according to an embodiment of the present disclosure.

At present, in the related art, in the above-mentioned random access research of NR-U, since an LBT mechanism is introduced, a failure of the LBT of the terminal may cause that a terminal is unable to contend for an uplink resource among the uplink resources allocated for the MSG3 in the RAR received from the base station during the contention-based random access procedure, which results in a failure of random access of the terminal in the NR-U. Referring to FIG. 3, which shows a schematic diagram of a random access failure of a terminal caused by a failure of LBT according to an embodiment of the present disclosure, and as shown in FIG. 3, the terminal sends a MSG1 to the base station at the initial random access, and upon receiving the MSG1 sent by the terminal, the base station sends a MSG2 in response to the MSG1 for allocating the uplink resource, and the like. The terminal may perform LBT before sending the MSG3, and if detecting that the channel is in a busy state ("channel is busy" as shown in FIG. 3), the terminal cannot send the MSG3 on the allocated uplink resource, which results in a failure of random access of the terminal (as shown in a dashed line in FIG. 3).

Figure 4:
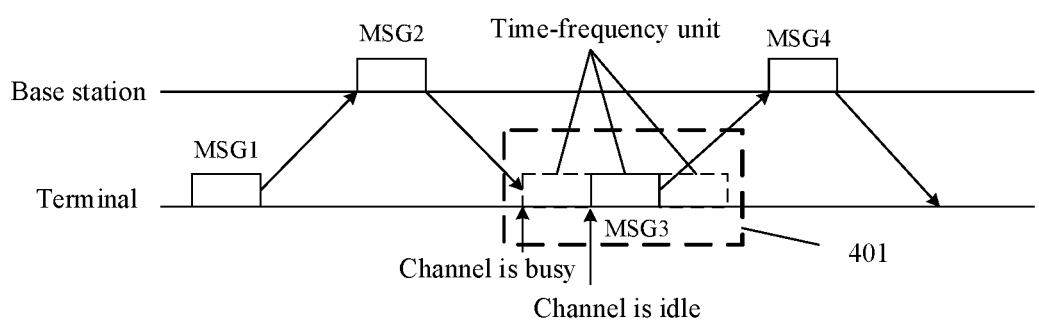
FIG. 4 is a schematic diagram of a random access procedure based on multiple transmission opportunities (TxOPs) according to an embodiment of the present disclosure.

A solution in which multiple Transmission Opportunities (TxOPs) is provided for the transmission of one or more messages (e.g., MSG1, MSG2, MSG3, MSG4) within a random access time window in NR-U is provided at present. Referring to FIG. 4, which shows a schematic diagram of a random access procedure based on multiple TxOPs according to an embodiment of the present disclosure, and as shown in FIG. 4, a time window 401 is included. The terminal may send the MSG1 to the base station at the initial random access, and upon receiving the MSG1 sent by the terminal, the base station sends a MSG2 in response to the MSG1 for allocating the uplink resource, and the like. The uplink resource may have multiple TxOPs, that is, the time window 401 may include multiple time-frequency units. The terminal may perform LBT in the time window 401, to detect a time-frequency unit of the uplink resource in an idle state, and the terminal may send the MSG3 to the base station through the time-frequency unit in the idle state, so that the terminal may detect other idle time-frequency units after detecting a state of the time-frequency unit is a "channel is busy" state, and continue to perform a subsequent random access operation, thereby avoiding the random access of the terminal from failing due to one failure of LBT.

However, in the above proposed solution, when multiple terminals send identical MSG1s on a same time-frequency resource, the introduction of TxOPs of multiple MSG3s may cause that the MSG3s sent by the multiple terminals on the allocated different time-frequency units are responsive to a same MSG2. In this case, the base station may receive the MSG3s from the multiple terminals at different times and send the MSG4s at different times. When the terminal detects that the MSG3 sent by itself matches a terminal identifier of the received MSG4, the terminal may announce that random access thereof is successful. If the multiple terminals are in the idle state, a TC-RNTI indicated in the same MSG2 may be upgraded to the respective C-RNTI, resulting in that the multiple terminals having identical C-RNTI.

Figure 5:
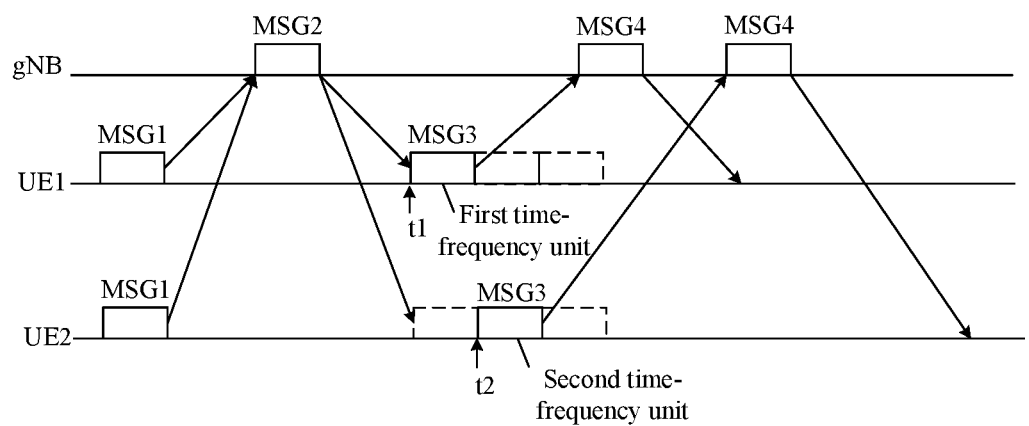
FIG. 5 is a schematic diagram of a random access procedure according to an embodiment of the present disclosure.

For example, referring to FIG. 5, which shows a schematic diagram of a random access procedure according to an embodiment of the present disclosure, and as shown in FIG. 5, two terminals UE1 and UE2 in the idle state and an accessible base station gNB are contained. A first time-frequency unit has a starting time t1 and a second time-frequency unit has a starting time t2. Herein, UE1 and UE2 may send identical MSG1 on a same time-frequency resource at the initial access. Upon receiving the same MSG1, the gNB may deliver a same MSG2. In this case, UE1 and UE2 may also obtain a same TC-RNTI and send a MSG3 on corresponding time-frequency resources based on the respective LBT results. That is, as shown in FIG. 5, UE1 sends MSG3 at time t1 and UE2 sends MSG3 at time t2. Since UE1 and UE2 send the MSGs3 at different times, the gNB may receive the MSGs3 sent by UE1 and UE2 at different times, and send MSGs4 to UE1 and UE2, respectively. UE1 and UE2 each compares the terminal identifier carried in the received MSG4 with the terminal identifier carried in the MSG3 sent by the UE. When the terminal identifiers match, the terminal announces that the random access is successful, and updates the TC-RNTI obtained from the MSG2 to a C-RNTI thereof. Since UE1 and UE2 shown in FIG. 5 have the same TC-RNTI, there is a problem that different terminals have the same C-RNTI when upgrading the TC-RNTIs to their own C-RNTIs, which causes a problem that the base station cannot correctly address by using the C-RNTI.

Figure 6:
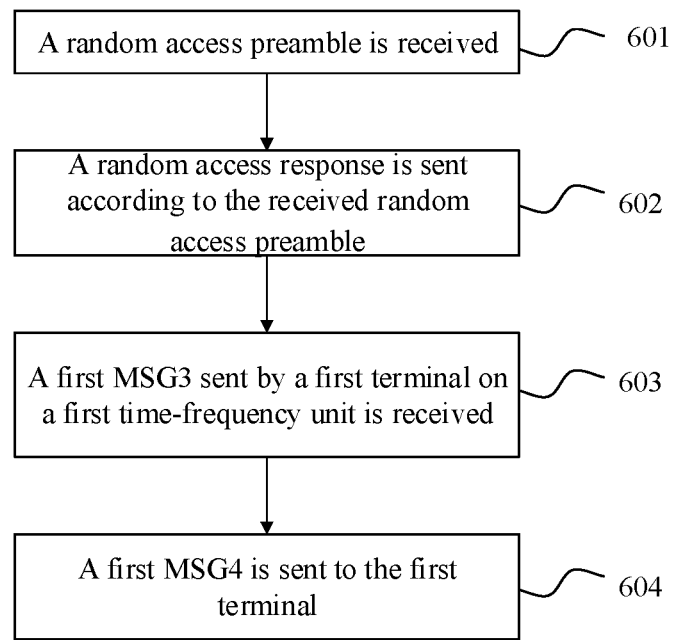
FIG. 6 is a method flowchart of a method for random access according to an embodiment of the present disclosure.

In order to solve the problems of the above solution, the present disclosure provides a method for random access. Referring to FIG. 6, which shows a method flowchart of a method for random access according to an embodiment of the present disclosure, the method may be applied in the radio communication system shown in FIG. 1. An NR-U random access procedure between a terminal and a base station can be performed by a base station supporting the NR-U capability in the radio communication system. As shown in FIG. 6, the method can include the following operations.

At 601, a random access preamble is received.

At 602, an RAR is sent according to the received random access preamble. The RAR includes resource indication information for indicating at least two time-frequency units, and the at least two time-frequency units are different time-frequency units in time domain on an unlicensed channel.

At 603, a first random access message 3 MSG3 sent by a first terminal on a first time-frequency unit is received. The first time-frequency unit is any one of the at least two time-frequency units, and the first MSG3 includes a terminal identifier of the first terminal:

At 604, a first random access message 4 MSG4 is sent to the first terminal. The first MSG4 carries a terminal identifier of the first terminal and a first C-RNTI allocated to the first terminal.

Optionally, the method further comprises an operation before the operation the first MSG4 is sent to the first terminal.

In response to that the first time-frequency unit is parsed to obtain the MSG3 fed back respectively by two or more terminals for the RAR, it is determined that the first terminal of the two or more terminals is a terminal that is succeeded in this random access.

Optionally, the operation that a first random access message 3 MSG3 sent by a first terminal on a first time-frequency unit is received includes an operation as follows.

The first MSG3 sent by the first terminal on the first time-frequency unit in an LBT manner is received.

Optionally, the method further includes operations as follows.

A second MSG3 sent by a second terminal on a second time-frequency unit is received. The second time-frequency unit is another time-frequency unit of the at least two time-frequency units, and the second MSG3 includes a terminal identifier of the second terminal.

A second random access message 4 MSG4 is sent to the second terminal. The second MSG4 carries a terminal identifier of the second terminal and a second C-RNTI allocated to the second terminal, and the first C-RNTI is different from the second C-RNTI. Optionally, the terminal identifier is an IMSI of a terminal or a random number.

Optionally, the at least two time-frequency units are identical in frequency domain and continuous in time domain: or the at least two time-frequency units are identical in frequency domain and discontinuous in time domain: or the at least two time-frequency units are different in frequency domain and continuous in time domain: or the at least two time-frequency units are different in frequency domain and discontinuous in time domain.

Optionally, the resource indication information indicates starting time-frequency positions of the at least two time-frequency units.

In summary, the base station receives a random access preamble, sends, according to the received random access preamble, a random access response RAR, where the RAR includes resource indication information for indicating at least two time-frequency units, and the at least two time-frequency units are different time-frequency units in time domain on an unlicensed channel: receives a first random access message 3 MSG3 sent by a first terminal on a first time-frequency unit: and sends a first random access message 4 MSG4 to the first terminal, where the first MSG4 carries a terminal identifier of the first terminal and a first C-RNTI allocated to the first terminal. Accordingly, upon receiving the MSG4, the first terminal can directly obtain the C-RNTI carried in the MSG4 as its own C-RNTI, so that the base station can correctly address the first terminal through the C-RNTI. That is to say, in the present disclosure, when receiving the MSGs3 fed back by different terminals for the same RAR at different times, the base station may allocate different C-RNTIs to different terminals, so that the contention-based random access based on the unlicensed channel is realized, and the problem that the first terminal has a same C-RNTI as other terminals in the contention-based random access procedure based on the NR-U in the LBT mechanism is avoided.

Figure 7:
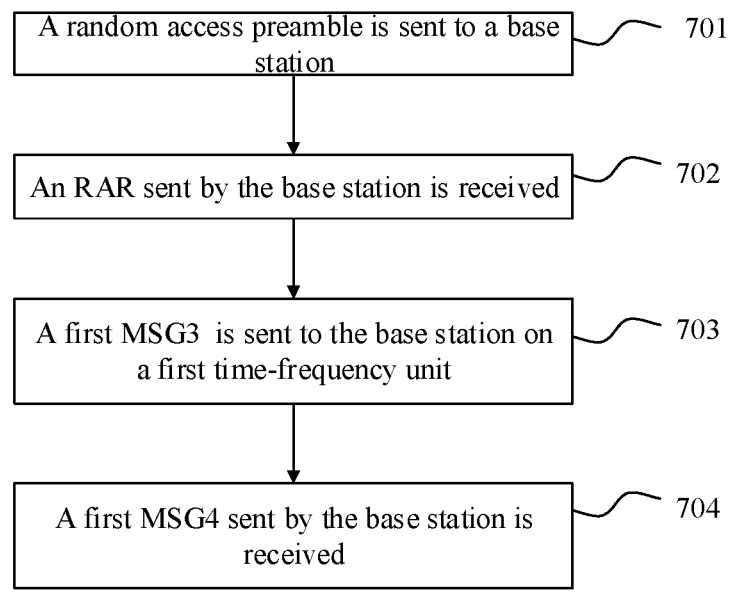
FIG. 7 is a method flowchart of a method for random access according to an embodiment of the present disclosure.

Referring to FIG. 7, which shows a method flowchart of a method for random access according to an embodiment of the present disclosure, the method may be applied in the radio communication system shown in FIG. 1. An NR-U random access procedure between a terminal and a base station may be performed by a terminal supporting the NR-U capability in the radio communication system. As shown in FIG. 7, the method may include the following operations.

At 701, a random access preamble is sent to a base station.

At 702, a random access response RAR sent by the base station is received. The RAR includes resource indication information for indicating at least two time-frequency units, and the at least two time-frequency units are different time-frequency units in time domain on an unlicensed channel.

At 703, a first random access message 3 MSG3 is sent to the base station on a first time-frequency unit. The first time-frequency unit is any one of the at least two time-frequency units, and the first MSG3 includes a terminal identifier of the terminal.

At 704, a first MSG4 sent by the base station is received. The first MSG4 carries a terminal identifier of the terminal and a first C-RNTI allocated by the base station to the first terminal.

Optionally, the operation that the first random access message 3 MSG3 is sent to the base station on a first time-frequency unit includes: sending, on the first time-frequency unit, the first MSG3 in an LBT manner.

Optionally, the terminal identifier is an IMSI of a terminal or a random number.

Optionally, the at least two time-frequency units are identical in frequency domain and continuous in time domain: or the at least two time-frequency units are identical in frequency domain and discontinuous in time domain; or the at least two time-frequency units are different in frequency domain and continuous in time domain: or the at least two time-frequency units are different in frequency domain and discontinuous in time domain.

Optionally: the resource indication information indicates starting time-frequency positions of the at least two time-frequency units.

In summary, the base station receives a random access preamble, sends, according to the received random access preamble, a random access response RAR, where the RAR includes resource indication information for indicating at least two time-frequency units, and the at least two time-frequency units are different time-frequency units in time domain on an unlicensed channel: receives a first random access message 3 MSG3 sent by a first terminal on a first time-frequency unit: and sends a first random access message 4 MSG4 to the first terminal, where the first MSG4 carries a terminal identifier of the first terminal and a first C-RNTI allocated to the first terminal. Accordingly, upon receiving the MSG4, the first terminal can directly obtain the C-RNTI carried in the MSG4 as its own C-RNTI, so that the base station can correctly address the first terminal through the C-RNTI. That is to say, in the present disclosure, when receiving the MSGs3 fed back by different terminals for the same RAR at different times, the base station may allocate different C-RNTIs to different terminals, so that the contention-based random access based on the unlicensed channel is realized, and the problem that the first terminal has a same C-RNTI as other terminals in the contention-based random access procedure based on the NR-U in the LBT mechanism is avoided.

In a possible implementation, in the radio communication system shown in FIG. 1, a base station supporting the NR-U capability may broadcast a system message through unicast RRC signaling. A terminal supporting the NR-U capability may receive the system message broadcast by the base station. A terminal that needs to access the base station may generate a MSG1 for contention-based random access according to information carried in the system message, send the MSG1 to the base station, and start a process of accessing the base station.

Figure 8:
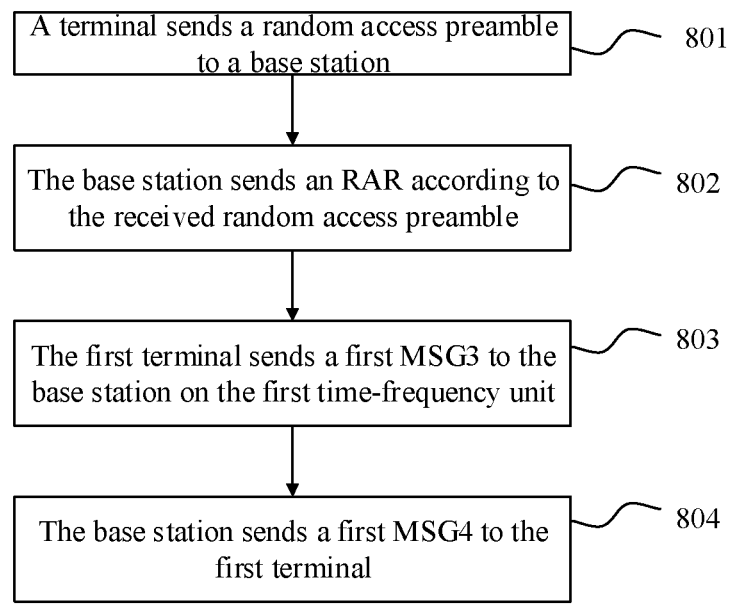
FIG. 8 is a method flowchart of a method for random access according to an embodiment of the present disclosure.

Referring to FIG. 8, which shows a method flowchart of a method for random access according to an embodiment of the present disclosure, as shown in FIG. 8, the method for random access may be applied to the radio communication system shown in FIG. 1, and the method may include the following operations.

At 801, a terminal sends a random access preamble to a base station.

Accordingly, the base station receives the random access preamble sent by the terminal.

In a possible implementation, the terminal may obtain preamble information carried in a Master Information Block (MIB) or System Information Block (SIB) from the system message and a Physical Random Access Channel (PRACH) required for random access, including the number of PRACHs and time-frequency position and the like. The terminal may parse to obtain the preamble information and configure the preamble information to the MAC, and the MAC randomly selects a preamble index from a preamble set according to path loss information and the like and configures the preamble index to the physical layer. According to the preamble index of the MAC, the physical layer generates a valid random access preamble by looking up a table/using formula and sends the valid random access preamble to the base station. The base station may receive the random access preamble sent by the terminal on the corresponding PRACH channel resource.

Optionally, the above PRACH channel resource may include a channel resource on the unlicensed channel. That is to say, in the embodiment of the present disclosure, when the terminal has a capability of using the unlicensed frequency band based on the cellular mobile communication technology, the random access preamble may be sent on the time-frequency resource corresponding to the unlicensed frequency band.

Optionally; multiple terminals may send identical random access preambles to the base station on a same time-frequency resource on the PRACH channel resource. Correspondingly, the base station may receive the random access preambles sent by the multiple terminals.

At 802, the base station sends a random access response RAR according to the received random access preamble.

Correspondingly, the terminal receives the RAR sent by the base station. The RAR includes resource indication information for indicating at least two time-frequency units, and the at least two time-frequency units are different time-frequency units in time domain on an unlicensed channel.

Optionally, in the embodiment of the present disclosure, when the base station receives the random access preamble on the unlicensed frequency band, the base station may also send the RAR corresponding to the random access preamble on the time-frequency resource corresponding to the unlicensed frequency band.

Optionally, the base station may perform blind detection on the random access preamble sent by the terminal in the PRACH. If the random access preamble sent by the terminal is detected by the base station, the base station may also report the random access preamble to the MAC, and the MAC generates an RAR corresponding to the random access preamble received by the base station. The base station may subsequently feed back the RAR to the terminal through a Physical Downlink Shared Channel (PDSCH) within a time-frequency resource responding to random access of the terminal. Optionally, in sending the RAR, the base station may scramble a Physical Downlink Controlled Channel (PDCCH) corresponding to the PDSCH by using a Random Access-Radio Network Temporary Identity (RA-RNTI). The RA-RNTI corresponds to a time-frequency resource occupied by transmission of the preamble detected by the base station. In this case, the terminal may calculate a corresponding RA-RNTI and descramble the PDCCH using the RA-RNTI, and further decode channel content of the PDSCH.

Optionally: a TC-RNTI may be carries in the RAR and be used by the terminal to upgrade the TC-RNTI to a C-RNTI in a subsequent random access process. However, it is not necessary to scramble the RAR by using the C-RNTI in the present disclosure. That is, the base station may scramble the RAR by using the TC-RNTI, or may scramble the RAR without using the TC-RNTI. The allocation of the C-RNTI of the terminal may be completed by a subsequent random access operation.

In a possible implementation, the RAR fed back by the base station to the terminal through the PDSCH may include resource indication information for indicating at least two time-frequency units on the unlicensed channel, so that the terminal can select an appropriate time-frequency unit on the unlicensed channel through the LBT manner to send a subsequent MSG3 for random access.

Optionally, the resource indication information may indicate starting time-frequency positions of the at least two time-frequency units.

Figure 9:
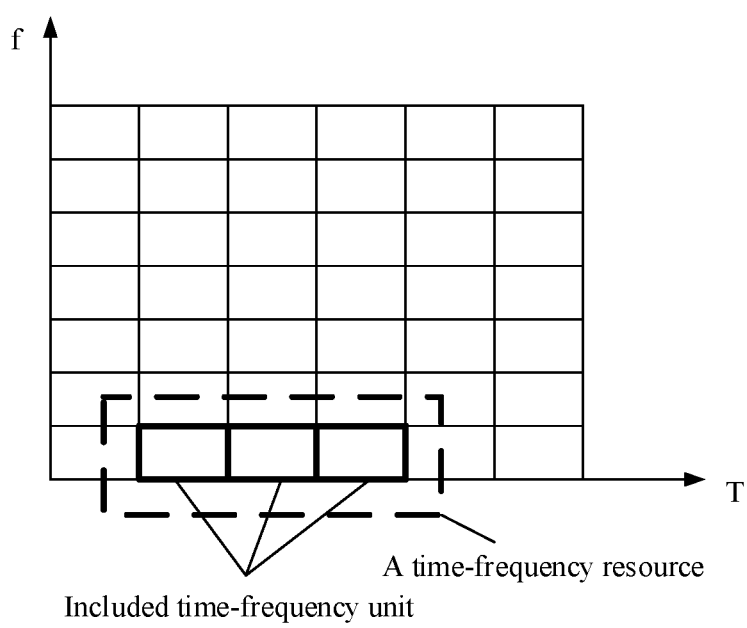
FIG. 9 is a schematic diagram of at least two time-frequency units according to an embodiment of the present disclosure.
Figure 10:
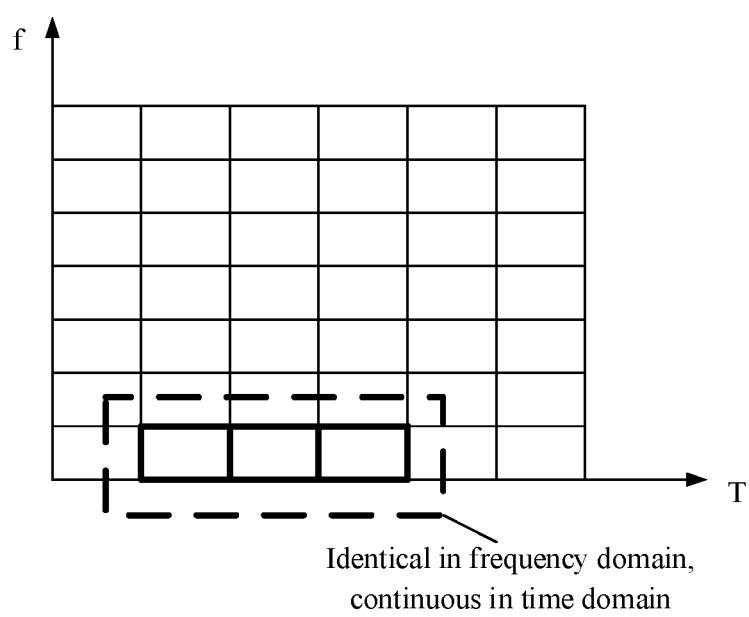
FIGS. 10 to 13 are schematic diagrams of three time-frequency units included in a time-frequency resource according to an embodiment of the present disclosure.
Figure 11:
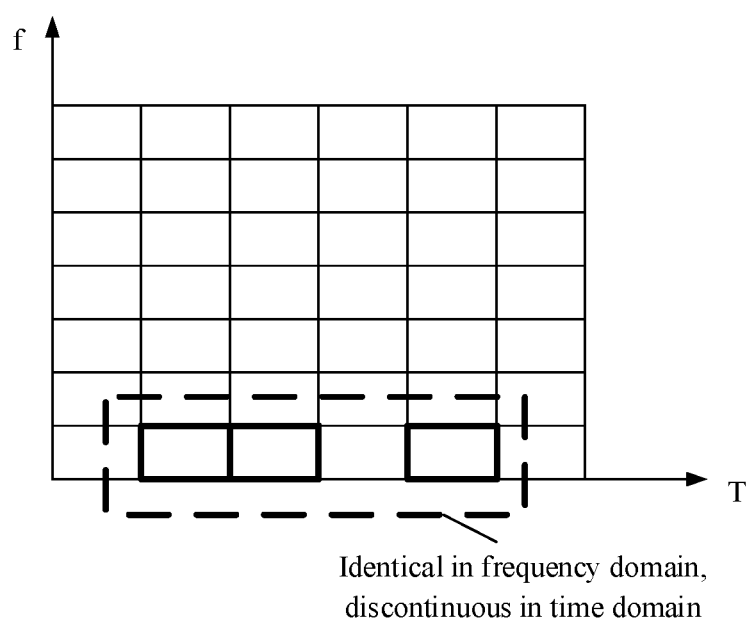
Figure 12:
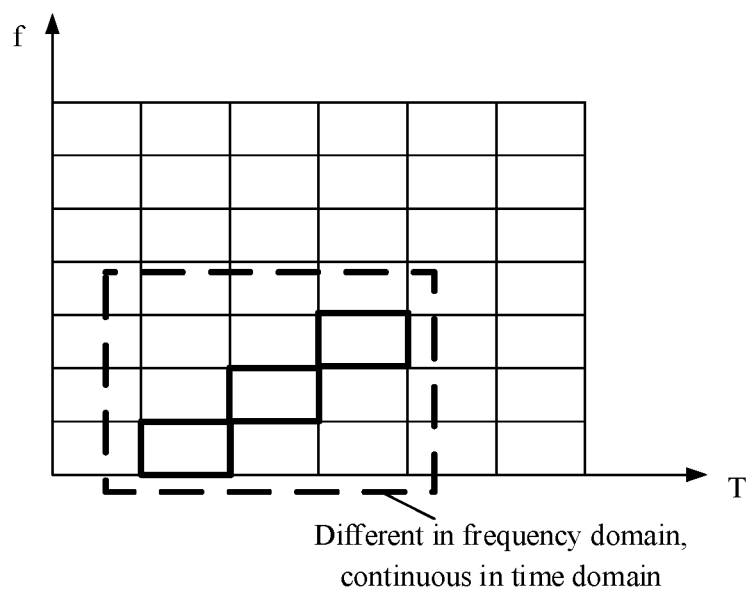
Figure 13:
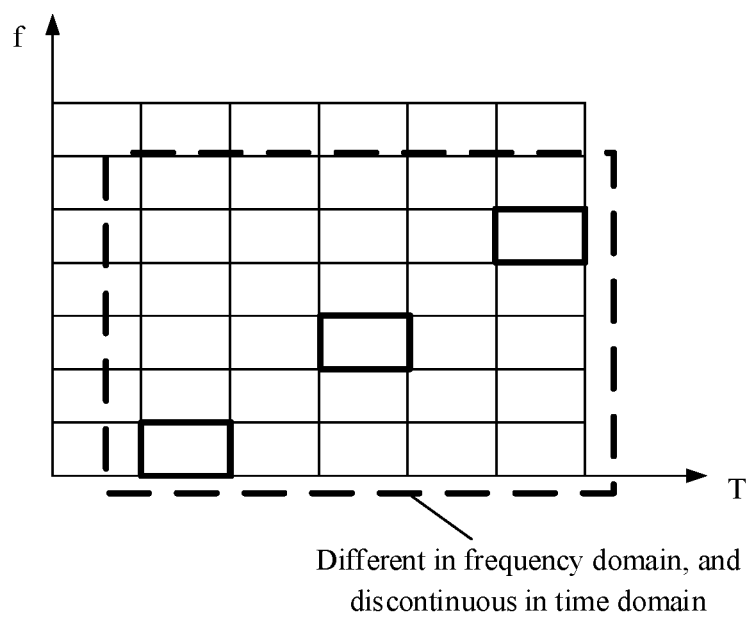

For example, referring to FIG. 9, which shows a schematic diagram of at least two time-frequency units according to an embodiment of the present disclosure, and as shown in FIG. 9, a time-frequency resource may include multiple time-frequency units, and a starting time-frequency position of each time-frequency unit may be indicated by resource indication information. The terminal may parse to obtain the information included in the RAR, and send the MSG3 at the starting time-frequency position. Optionally, a case that a time-frequency resource includes three time-frequency units is taken as an example. In a possible implementation, the at least two time-frequency units may be identical in frequency domain and continuous in time domain: or the at least two time-frequency units may be identical in frequency domain and discontinuous in time domain: or the at least two time-frequency units may be different in frequency domain and continuous in time domain: or the at least two time-frequency units may be different in frequency domain and discontinuous in time domain. Referring to FIGS. 10 to 13, which is a schematic diagram of three time-frequency units included in a time-frequency resource according to an embodiment of the present disclosure, and as shown in FIGS. 10 to 13, the form of the time-frequency unit included in the time-frequency resource that instructs the terminal to send the MSG3 in RAR may be at least one of the forgoing.

In a possible implementation, the above RAR may be sent by the base station after the base station performs blind detection random access preambles sent by multiple terminals, that is, the RAR may be responsive to the identical random access preambles sent by multiple terminals on the same time-frequency resource, and the multiple terminals may also correspondingly receive the same RAR.

At 803, the first terminal sends a first random access message MSG3 to the base station on the first time-frequency unit.

Correspondingly, the base station receives the first MSG3 sent by the first terminal on the first time-frequency unit.

Optionally, the first terminal may be any one of terminals that receive the RAR fed back by the base station. The first time-frequency unit may be any one of the at least two time-frequency units. Optionally, the first terminal may parse the received RAR to obtain a time-frequency resource included in the RAR, and the first terminal may send the first MSG3 on a corresponding time-frequency resource. Optionally, the first terminal may send the first MSG3 on a corresponding idle time-frequency unit when detecting that there is an idle time-frequency unit in the included at least two time-frequency units in a manner of LBT monitoring.

Optionally, when the first terminal sends the first MSG3, the first terminal may be in a connected state or an idle state. The first MSG3 sent by the first terminal in the connected state may carry its own C-RNTI. The base station addresses the first terminal according to the C-RNTI obtained by the parsing, and sends the MSG4 to the first terminal. The first MSG3 sent by the first terminal in the idle state does not include the C-RNTI. In this case, the base station may allocate a C-RNTI that is not used by other terminals to the first terminal, carry the C-RNTI in the MSG4, and deliver it to the first terminal.

In a possible implementation, the first terminal may parse to obtain the resource indication information of the at least two time-frequency units included in the RAR, and monitor whether the time-frequency unit is idle through the LBT within a preset time period before the starting time-frequency position indicated by the resource indication information. If it is detected that a first incoming time-frequency unit is busy: the first terminal may continue monitoring whether the time-frequency unit is idle within a preset time period before a starting time-frequency position of a next time-frequency unit. When an idle time-frequency unit is detected, the first terminal may send the first MSG3 on the idle time-frequency unit. The preset time period may be set in advance in the terminal by the developer or the operation and maintenance personnel.

Optionally: the first MSG3 may include a terminal identifier of the first terminal. Optionally: the terminal identifier of the first terminal is an IMSI corresponding to the first terminal or is a random number.

Figure 14:
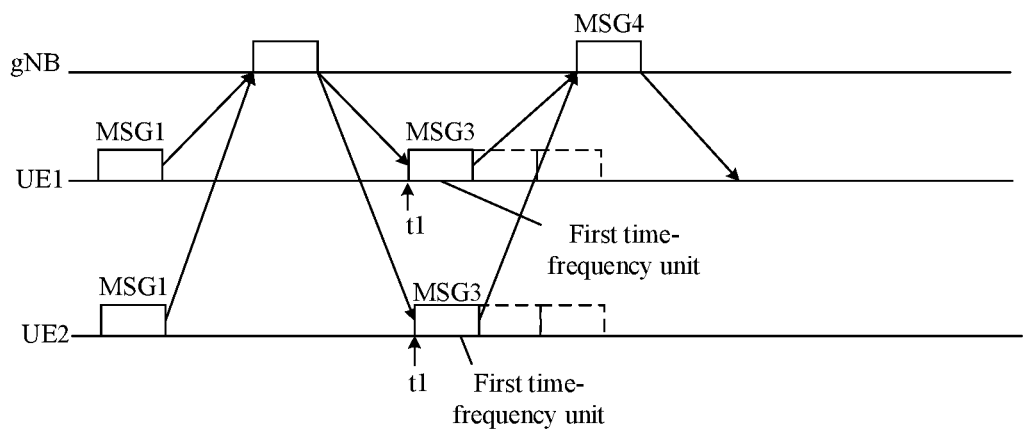
FIG. 14 is a schematic diagram of sending a MSG3 to a base station by a terminal according to an embodiment of the present disclosure.

In a possible implementation, due to the LBT manners of different terminals and the distances of different terminals from the base station, the two or more terminals may monitor through the LBT manner that the first time-frequency unit is in the idle state. Accordingly, the two or more terminals may send the MSGs3 on the first time-frequency unit, so that there are two or more terminals that send the MSG3 to the base station on the first time-frequency unit. Referring to FIG. 14, which shows a schematic diagram of sending a MSG3 to a base station by a terminal according to an embodiment of the present disclosure, and as shown in FIG. 14, two or more terminals send MSGs3 on the first time-frequency unit in response to the same RAR (i.e., MSG2 in the figure) fed back by the base station. In this case, in response to that the base station parses the first time-frequency unit to obtain the MSGs3 fed back by two or more terminals respectively in response to the above RAR, the base station may first determine that the first terminal of the two or more terminals is a terminal in which random access is successful, and may finally send MSG4 only to the first terminal. Optionally, the determination of the first terminal may be similar to a contention resolution based on LTE contention random access, and details are not described herein.

In a possible implementation, the base station may receive a second MSG3 sent by the second terminal on the second time-frequency unit. Optionally, the base station may also receive the second MSG3 transmitted by the second terminal on the second time-frequency unit. The second time-frequency unit is another time-frequency unit different from the first time-frequency unit in the at least two time-frequency units. The principle of sending the second MSG3 by the second terminal on the second time-frequency unit is similar to that of sending the first MSG3 by the first terminal on the first time-frequency unit, and details are not described herein. Optionally, the second MSG3 may include a terminal identifier of the second terminal, and the terminal identifier of the second terminal may be an IMSI corresponding to the second terminal or a random number. It should be noted that the first terminal and the second terminal are different terminals that send the identical random access preambles to the base station on the same time-frequency resource in operation 801.

At 804, the base station sends a first random access message MSG4 to the first terminal.

Correspondingly, the first terminal receives the first MSG4 sent by the base station.

Herein, the first MSG4 carries a terminal identifier of the first terminal and a first C-RNTI allocated by the base station to the terminal.

Optionally, the base station may send a first MSG4 at a time-frequency resource position corresponding to the above first time-frequency unit to the first terminal. The terminal identifier of the first terminal carried in the first MSG4 may be obtained by the base station by parsing the MSG3 sent by the first terminal. Since the MSG3 sent by the terminal in the connected state carries an existing C-RNTI, the base station may parse the MSG3 to obtain the C-RNTI of the first terminal, carry the C-RNTI in the MSG4, and send the MSG4 to the first terminal. The base station may allocate a C-RNTI, which is not used by other terminals, to the first terminal in the idle state, and carry the two pieces of information (the IMSI of the first terminal and the C-RNTI allocated to the first terminal) in the MSG4, and send the MSG4 to the first terminal.

In a possible implementation, the base station parses the first MSG3 sent by the first terminal in the idle state on the first time-frequency unit, to obtain in response to which RAR the first MSG3 sent by the first terminal is sent, selects a C-RNTI for the first terminal, and sends the MSG4 to the first terminal in the idle state. Optionally, according to the terminal identifier carried in the received MSG4 and the C-RNTI allocated by the base station, when the terminal identifier carried in the MSG4 is the same as the terminal identifier of the first terminal, the first terminal may announce that random access is successful, and use the C-RNTI allocated by the base station as an identifier in the base station, so that the base station can address the first terminal through the C-RNTI.

Corresponding to one of the above-mentioned possible implementations, the base station may allocate a C-RNTI, which is not used by other terminals, to the second terminal in the idle state, and send a second random access message MSG4 to the second terminal. Correspondingly, the second terminal may receive the MSG4 sent by the base station, and obtain the C-RNTI carried therein as its own identifier in the base station. The C-RNTI allocated by the base station to the second terminal is different from the C-RNTI allocated to the first terminal.

Figure 15:
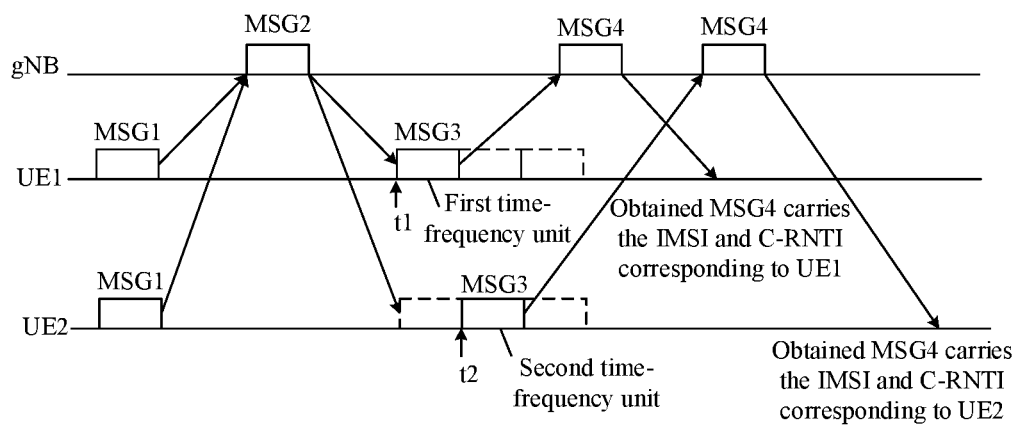
FIG. 15 is a schematic diagram of a random access process according to an embodiment of the present disclosure.

In a possible implementation, taking the IMSI as an example of the terminal identifier carried in the MSG4, referring to FIG. 15, which shows a schematic diagram of a random access process according to an embodiment of the present disclosure, and as shown in FIG. 15, two terminals UE1 and UE2 in the idle state and an accessible base station gNB are included. UE1 and UE2 send identical random access preambles on the same time-frequency resource. The base station gNB receives two identical random access preambles at the same time and responds to a same RAR (that is, MSG2 in FIG. 15) and broadcasts the RAR through a system message. Correspondingly, both UE1 and UE2 can receive the RAR and respectively send MSGs3 on the time-frequency units monitored in the LBT manner. The base station receives the two MSGs3 feed back for the same RAR at different times, and can respectively send MSGs4 in response to the two MSG3. In addition to the IMSI of the corresponding terminal (UE1 and UE2), the MSG4 carries the C-RNTI which is allocated by the base station to the corresponding terminal. After receiving the MSG4. UE1 and UE2 can use the C-RNTI carried in the MSG4 as identification information thereof in the gNB and further announce that random access thereof is successful. Optionally, the random access principle when the terminal identifier carried in the MSG4 is a random number is similar to that when the terminal identifier carried in the MSG4 is an IMSI, and details are not described herein.

In summary, the base station receives a random access preamble, sends, according to the received random access preamble, a random access response RAR, where the RAR includes resource indication information for indicating at least two time-frequency units, and the at least two time-frequency units are different time-frequency units in time domain on an unlicensed channel: receives a first random access message 3 MSG3 sent by a first terminal on a first time-frequency unit: and sends a first random access message 4 MSG4 to the first terminal, where the first MSG4 carries a terminal identifier of the first terminal and a first C-RNTI allocated to the first terminal. Accordingly, upon receiving the MSG4, the first terminal can directly obtain the C-RNTI carried in the MSG4 as its own C-RNTI, so that the base station can correctly address the first terminal through the C-RNTI. That is to say, in the present disclosure, when receiving the MSGs3 fed back by different terminals for the same RAR at different times, the base station may allocate different C-RNTIs to different terminals, so that the contention-based random access based on the unlicensed channel is realized, and the problem that the first terminal has a same C-RNTI as other terminals in the contention-based random access procedure based on the NR-U in the LBT mechanism is avoided.

Device embodiments of the present disclosure are described below; which may be used to perform the method embodiment of the present disclosure. For details not disclosed in the disclosed device embodiments, reference is made to the disclosed method embodiments.

Figure 16:
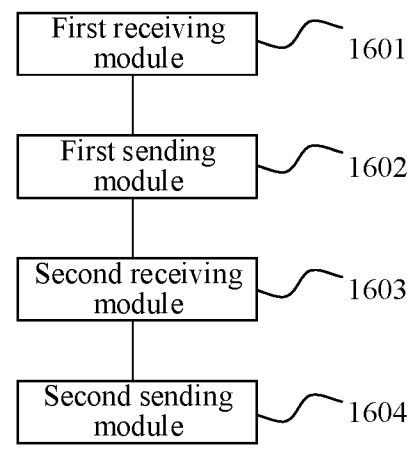
FIG. 16 is a block diagram of a device for random access according to an exemplary embodiment.

FIG. 16 is a block diagram of a device for random access according to an exemplary embodiment, as shown in FIG. 16, the device for random access may be implemented as all or a portion of the base station in the implementation environment shown in FIG. 1 by hardware or a combination of software and hardware, to perform the operations performed by the base station in the embodiment shown in either FIG. 6 or FIG. 8. The device for random access may include: a first receiving module 1601, a first sending module 1602, a second receiving module 1603 and a second sending module 1604.

The first receiving module 1601 is configured to receive a random access preamble.

The first sending module 1602 is configured to send, according to the received random access preamble, a random access response RAR. The RAR includes resource indication information for indicating at least two time-frequency units, and the at least two time-frequency units are different time-frequency units in time domain on an unlicensed channel.

The second receiving module 1603 is configured to receive a first random access message 3 MSG3 sent by a first terminal on a first time-frequency unit. The first time-frequency unit is any one of the at least two time-frequency units, and the first MSG3 includes a terminal identifier of the first terminal.

The second sending module 1604 is configured to send a first random access message 4 MSG4 to the first terminal. The first MSG4 carries a terminal identifier of the first terminal and a first C-RNTI allocated to the first terminal.

Optionally, the device further includes a determining module.

The determining module is configured to: before the second sending module sends the first random access message 4 MSG4 to the first terminal, in response to that the first time-frequency unit is parsed to obtain the MSGs3 fed back by two or more terminals respectively for the RAR, determine that the first terminal of the two or more terminals is a terminal that is succeeded in random access.

Optionally, the second receiving module 1603 is configured to receive the first MSG3 sent by the first terminal on the first time-frequency unit in an LBT manner.

Optionally, the device further includes a third receiving module and a third sending module. The third receiving module is configured to receive, a second MSG3 sent by a second terminal on a second time-frequency unit. The second time-frequency unit is another time-frequency unit of the at least two time-frequency units, and the second MSG3 includes a terminal identifier of the second terminal.

The third sending module is configured to send a second random access message 4 MSG4 to the second terminal. The second MSG4 carries a terminal identifier of the second terminal and a second C-RNTI allocated to the second terminal, and the first C-RNTI is different from the second C-RNTI.

Optionally, the terminal identifier is an IMSI of a terminal or a random number.

Optionally; the at least two time-frequency units are identical in frequency domain and continuous in time domain: or the at least two time-frequency units are identical in frequency domain and discontinuous in time domain: or the at least two time-frequency units are different in frequency domain and continuous in time domain; or the at least two time-frequency units are different in frequency domain and discontinuous in time domain.

Optionally, the resource indication information indicates starting time-frequency positions of the at least two time-frequency units.

Figure 17:
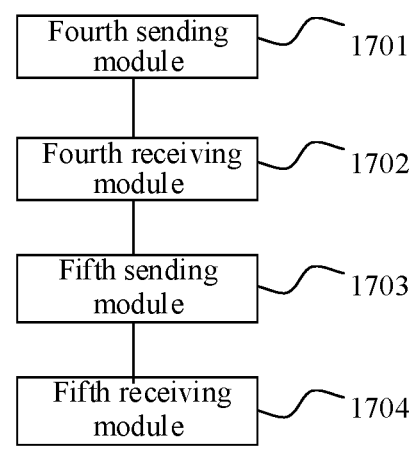
FIG. 17 is a block diagram of a device for random access according to an exemplary embodiment.

FIG. 17 is a block diagram of a device for random access according to an exemplary embodiment, as shown in FIG. 17, the device for random access may be implemented as all or portion of the terminal in an implementation environment shown in FIG. 1 by hardware or a combination of software and hardware, to perform the operations performed by the terminal in the embodiment shown in either FIG. 7 or FIG. 8. The device for random access may include a fourth sending module 1701, a fourth receiving module 1702, a fifth sending module 1703 and a fifth receiving module 1704.

The fourth sending module 1701 is configured to send a random access preamble to a base station.

The fourth receiving module 1702 is configured to receive a random access response sent by the base station. The RAR includes resource indication information for indicating at least two time-frequency units, and the at least two time-frequency units are different time-frequency units in time domain on an unlicensed channel:

The fifth sending module 1703 is configured to send, on a first time-frequency unit, a first ransom access message 3 MSG3 to the base station. The first time-frequency unit is any one of the at least two time-frequency units, and the first MSG3 includes a terminal identifier of the terminal.

The fifth receiving module 1704 is configured to receive a first random access message 4 MSG4 sent by the base station. The first MSG4 carries a terminal identifier of the terminal and a first C-RNTI allocated by the base station to the first terminal.

Optionally; the fifth sending module 1703 is configured to send, on the first time-frequency unit, the first MSG3 in an LBT manner.

Optionally, the terminal identifier is an IMSI of a terminal or a random number.

Optionally, the at least two time-frequency units are identical in frequency domain and continuous in time domain: or the at least two time-frequency units are identical in frequency domain and discontinuous in time domain: or the at least two time-frequency units are different in frequency domain and continuous in time domain; or the at least two time-frequency units are different in frequency domain and discontinuous in time domain.

Optionally, the resource indication information indicates starting time-frequency positions of the at least two time-frequency units.

It should be noted that the device provided in the above-mentioned embodiments is described exemplarily with respect to division of the above-mentioned functional modules when implementing functions thereof. In practical application, the above-mentioned functions may be allocated to be implemented by different functional modules, that is, content structures of the device may be divided into different functional modules, to implement all or part of the functions described above.

With respect to the device in the above-described embodiments, the specific manner in which the various modules perform operations has been described in detail in the method embodiments, and will not be described in detail herein.

An exemplary embodiment of the present disclosure provides a device for random access capable of implementing all or a part of the operations performed by the base station in the above-described embodiment shown in FIG. 6 or FIG. 8 of the present disclosure. The device for random access includes a processor, and a memory for storing processor-executable instructions.

The processor is configured to: receive a random access preamble: send, according to the received random access preamble, a random access response RAR, where the RAR includes resource indication information for indicating at least two time-frequency units, and the at least two time-frequency units are different time-frequency units in time domain on an unlicensed channel: receive a first random access message 3 MSG3 sent by a first terminal on a first time-frequency unit, where the first time-frequency unit is any one of the at least two time-frequency units, and the first MSG3 includes a terminal identifier of the first terminal; and send a first random access message MSG4 to the first terminal, where the first MSG4 carries a terminal identifier of the first terminal and a first C-RNTI allocated to the first terminal.

Optionally, the processor is further configured to: before the second sending module sends the first random access message 4 MSG4 to the first terminal, in response to that the first time-frequency unit is parsed to obtain the MSGs3 fed back by two or more terminals respectively for the RAR, determine that the first terminal of the two or more terminals is a terminal in which random access is successful.

Optionally, the processor is configured to: receive the first MSG3 sent by the first terminal, on the first time-frequency unit, in an LBT manner.

Optionally, the processor is further configured to: receive a second MSG3 sent by a second terminal on a second time-frequency unit, where the second time-frequency unit is another time-frequency unit of the at least two time-frequency units, and the second MSG3 includes a terminal identifier of the second terminal: and send a second random access message 4 MSG4 to the second terminal, where the second MSG4 carries a terminal identifier of the second terminal and a second C-RNTI allocated to the second terminal, and the first C-RNTI is different from the second C-RNTI.

Optionally, the terminal identifier is an IMSI of a terminal or a random number.

Optionally, the at least two time-frequency units are identical in frequency domain and continuous in time domain: or the at least two time-frequency units are identical in frequency domain and discontinuous in time domain: or the at least two time-frequency units are different in frequency domain and continuous in time domain; or the at least two time-frequency units are different in frequency domain and discontinuous in time domain.

Optionally, the resource indication information indicates starting time-frequency positions of the at least two time-frequency units.

An exemplary embodiment of the present disclosure provides a device for random access capable of implementing all or a part of the operations performed by the terminal in the above-described embodiments shown in FIG. 7 or FIG. 8 of the present disclosure. The device for random access includes a processor and a memory for storing processor-executable instructions.

The processor is configured to: send a random access preamble to a base station; receive a random access response RAR sent by the base station, where the RAR includes resource indication information for indicating at least two time-frequency units, and the at least two time-frequency units are different time-frequency units in time domain on an unlicensed channel: send, on a first time-frequency unit, a first random access message 3 MSG3 to the base station, where the first time-frequency unit is any one of the at least two time-frequency units, and the first MSG3 includes a terminal identifier of the terminal: and receive a first random access message 4 MSG4 sent by the base station, where the first MSG4 carries a terminal identifier of the terminal and a first C-RNTI allocated by the base station to the first terminal.

Optionally, the processor is configured to: send, on the first time-frequency unit, the first MSG3 in an LBT manner.

Optionally, the terminal identifier is an IMSI of a terminal or a random number.

Optionally, the at least two time-frequency units are identical in frequency domain and continuous in time domain: or the at least two time-frequency units are identical in frequency domain and discontinuous in time domain: or the at least two time-frequency units are different in frequency domain and continuous in time domain: or the at least two time-frequency units are different in frequency domain and discontinuous in time domain.

Optionally; the resource indication information indicates starting time-frequency positions of the at least two time-frequency units.

The above-described solution provided in the embodiments of the present disclosure is described by taking a terminal and a base station as examples. It should be understood that the terminal and the base station include corresponding hardware structures and/or software modules for performing the respective functions in order to implement the above functions. In conjunction with the exemplary modules and algorithm operations described in the embodiments disclosed in present disclosure, the embodiments of the present disclosure can be implemented in hardware or a combination of hardware and computer software. Whether a function is performed in hardware or by driving the hardware through computer software depends on the particular application and design constraints of the solution. Those skilled in the art may use different methods to implement the described functions for each particular application, but such implementation should not be considered to be beyond the scope of the technical solutions of the disclosed embodiments.

Figure 18:
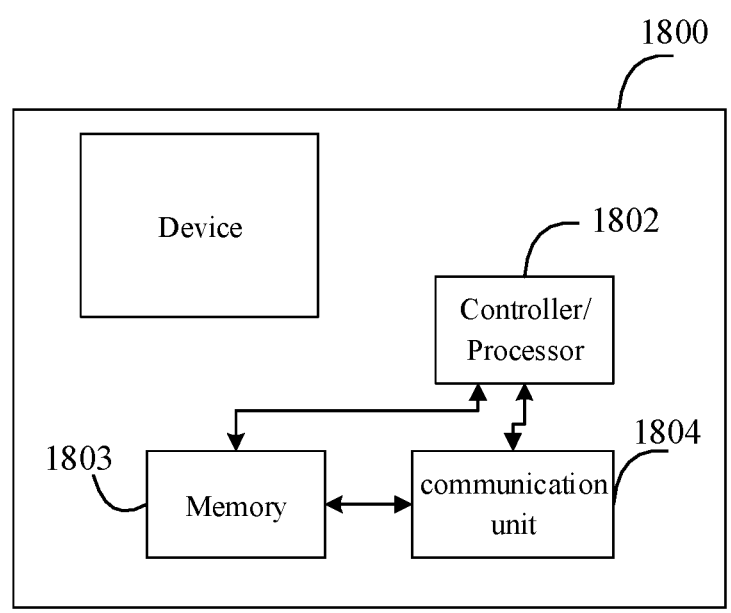
FIG. 18 is a schematic structural diagram of a device for random access according to an exemplary embodiment.

FIG. 18 is a schematic structural diagram of a device for random access according to an exemplary embodiment. The device 1800 may be implemented as the terminal or the base station in the various embodiments described above.

The device 1800 includes a communication unit 1804 and a processor 1802. The processor 1802 may also be a controller, which is shown as "controller/processor 1802 in FIG. 18". The communication unit 1804 is configured to support the terminal to communicate with other network devices (e.g., the base station, etc.).

Further, the device 1800 may further include a memory 1803 for storing program code and data of the terminal 1800.

It should be understood that FIG. 18 shows only a simplified design of the device 1800. In practical applications, the device 1800 may include any number of processors, controllers, memories, communication units, and the like, and all terminals or base stations that may implement the embodiments of the present disclosure are within the scope of the embodiments of the present disclosure.

Those skilled in the art will appreciate that in one or more of the above examples, the functions described in the embodiments of the present disclosure may be implemented in hardware, software, firmware, or any combination thereof. When implemented using software, these functions may be stored in a computer-readable medium or transmitted as one or more instructions or codes on the computer-readable medium. The computer-readable medium includes a computer storage medium and a communication medium. The communication medium includes any medium that facilitates transferring a computer program from one place to another place. The storage medium may be any available medium accessible to a general-purpose or special-purpose computer.

The embodiments of the present disclosure further provide a computer storage medium for storing computer software instructions used by the terminal or the base station described above, including a program for executing the above method for random access.

The technical solution provided by the present disclosure may include at least the following advantages.

A base station receives a random access preamble, sends, according to the received random access preamble, a random access response, where the RAR includes resource indication information for indicating at least two time-frequency units, and the at least two time-frequency units are different time-frequency units in time domain on an unlicensed channel: receives a first random access message 3 MSG3 sent by a first terminal on a first time-frequency unit: and sends a first random access message 4 MSG4 to the first terminal, where the first MSG4 carries a terminal identifier of the first terminal and a first C-RNTI allocated to the first terminal. Accordingly, upon receiving the MSG4, the first terminal can directly obtain the C-RNTI carried in the MSG4 as its own C-RNTI, so that the base station can correctly address the first terminal through the C-RNTI. That is to say, in the present disclosure, when receiving the MSGs3 fed back by different terminals for the same RAR at different times, the base station may allocate different C-RNTIs to different terminals, so that the random access based on unlicensed channel is realized, and the problem that the first terminal has a same C-RNTI as other terminals in the NR-U-based random access procedure in the LBT mechanism is avoided.

Other embodiments of the present disclosure will be apparent to those skilled in the art from consideration of the specification and practice of the present disclosure disclosed here. The disclosure is intended to cover any variations, uses, or adaptations of the disclosure conforming to the general principles thereof and including such departures from the present disclosure as come within known or customary practice in the art. The specification and examples are exemplary only, with a true scope and spirit of the disclosure being indicated by the following claims.

It will be understood that the present disclosure is not limited to the exact construction that has been described above and illustrated in the accompanying drawings, and that various modifications and changes may be made without departing from the scope thereof. The scope of the present disclosure is only limited by the appended claims.

What is claimed is:

1. A method for random access, comprising:
   receiving, by a base station, random access preambles sent by a first terminal and a second terminal on a same time-frequency resource;
   sending, by the base station according to the random access preambles, a Random Access Response (RAR) to the first terminal and the second terminal, wherein the RAR comprises resource indication information indicating at least two time-frequency units, and the at least two time-frequency units are different time-frequency units in time domain on an unlicensed channel;
   receiving, by the base station, a first random access message 3 (MSG3) sent by the first terminal on a first time-frequency unit, and a second random access message 3 (MSG3) sent by the second terminal on a second time-frequency unit, wherein the first time-frequency unit is any one of the at least two time-frequency units, and the second time-frequency unit is another one of the at least two time-frequency units, the first MSG3 comprises a terminal identifier of the first terminal and the second MSG3 comprises a terminal identifier of the second terminal; and
   sending, by the base station, a first random access message 4 (MSG4) to the first terminal and a second random access message 4 (MSG4) to the second terminal, wherein the first MSG4 carries the terminal identifier of the first terminal and a first Cell-Radio Network Temporary Identifier (C-RNTI) allocated to the first terminal, the second MSG4 carries the terminal identifier of the second terminal and a second Cell-Radio Network Temporary Identifier (C-RNTI) allocated to the second terminal;
   wherein the terminal identifier of the first terminal carried in the first MSG4 received by the first terminal is compared with the terminal identifier of the first terminal carried in the first MSG3 sent by the first terminal, and the terminal identifier of the second terminal carried in the second MSG4 received by the second terminal is compared with the terminal identifier of the second terminal carried in the second MSG3 sent by the second terminal.

2. The method of claim 1, further comprising:
   in response to determining that the first time-frequency unit is parsed to obtain MSGs3 fed back by the first terminal and the second terminal respectively for the RAR, determining that the first terminal of the first terminal and the second terminal is a terminal that is succeeded in random access.

3. The method of claim 1, wherein receiving the first MSG3 sent by the first terminal on the first time-frequency unit comprises:
   receiving the first MSG3 sent by the first terminal on the first time-frequency unit in a Listen Before Talk (LBT) manner.

4. The method of claim 1, wherein the terminal identifier is an International Mobile Subscriber Identification Number (IMSI) of a terminal or a random number.

5. The method of claim 1, wherein
   the at least two time-frequency units are identical in frequency domain and continuous in time domain; or
   the at least two time-frequency units are identical in frequency domain and discontinuous in time domain; or
   the at least two time-frequency units are different in frequency domain and continuous in time domain; or
   the at least two time-frequency units are different in frequency domain and discontinuous in time domain.

6. The method of claim 5, wherein the resource indication information indicates start time-frequency positions of the at least two time-frequency units.

7. A method for random access, comprising:
   sending, by each of a first terminal and a second terminal, a random access preamble to a base station on a same time-frequency resource;
   receiving, by the first terminal and the second terminal, a Random Access Response (RAR) sent by the base station, wherein the RAR comprises resource indication information indicating at least two time-frequency units, and the at least two time-frequency units are different time-frequency units in time domain on an unlicensed channel;
   sending, by the first terminal on a first time-frequency unit, a first random access message 3 (MSG3) to the base station, wherein the first time-frequency unit is any one of the at least two time-frequency units, and the first MSG3 comprises a terminal identifier of the first terminal;
   sending, by the second terminal on a second time-frequency unit, a second random access message 3 (MSG3) to the base station, wherein the second time-frequency unit is another one of the at least two time-frequency units, and the second MSG3 comprises a terminal identifier of the second terminal;
   receiving, by the first terminal, a first random access message 4 (MSG4) sent by the base station, wherein the first MSG4 carries the terminal identifier of the first terminal and a first Cell-Radio Network Temporary Identifier (C-RNTI) allocated by the base station to the first terminal;

receiving, by the second terminal, a second random access message 4 (MSG4) sent by the base station, wherein the second MSG4 carries the terminal identifier of the second terminal and a second Cell-Radio Network Temporary Identifier (C-RNTI) allocated by the base station to the second terminal; and comparing, by the first terminal, the terminal identifier of the first terminal carried in the first MSG4 received by the first terminal with the terminal identifier of the first terminal carried in the first MSG3 sent by the first terminal;

comparing, by the first terminal, the terminal identifier of the second terminal carried in the second MSG4 received by the second terminal with the terminal identifier of the second terminal carried in the second MSG3 sent by the second terminal.

8. The method of claim 7, wherein sending, on the first time-frequency unit, the first MSG3 to the base station comprises:

sending, on the first time-frequency unit, the first MSG3 in a Listen Before Talk (LBT) manner.

9. The method of claim 7, wherein the terminal identifier is an International Mobile Subscriber Identification Number (IMSI) of a terminal or a random number.

10. The method of claim 7, wherein
the at least two time-frequency units are identical in frequency domain and continuous in time domain; or
the at least two time-frequency units are identical in frequency domain and discontinuous in time domain; or
the at least two time-frequency units are different in frequency domain and continuous in time domain; or
the at least two time-frequency units are different in frequency domain and discontinuous in time domain.

11. The method of claim 10, wherein the resource indication information indicates starting time-frequency positions of the at least two time-frequency units.

12. A device for random access, comprising:
a processor; and
a memory for storing processor-executable instructions;
wherein the processor is configured to:
receive random access preambles sent by a first terminal and a second terminal on a same time-frequency resource;
send, according to the random access preamble, a Random Access Response (RAR), wherein the RAR comprises resource indication information indicating at least two time-frequency units, and the at least two time-frequency units are different time-frequency units in time domain on an unlicensed channel;
receive a first random access message 3 (MSG3) sent by the first terminal on a first time-frequency unit and a second random access message 3 (MSG3) sent by the second terminal on a second time-frequency unit, wherein the first time-frequency unit is any one of the at least two time-frequency units, and the second time-frequency unit is another one of the at least two time-frequency units, the first MSG3 comprises a terminal identifier of the first terminal and the second MSG3 comprises a terminal identifier of the second terminal; and send a first random access message 4 (MSG4) to the first terminal and a second random access message 4 (MSG4) to the second terminal, wherein the first MSG4 carries the terminal identifier of the first terminal and a first Cell-Radio Network Temporary Identifier (C-RNTI) allocated to the first terminal, the second MSG4 carries the terminal identifier of the second terminal and a second Cell-Radio Network Temporary Identifier (C-RNTI) allocated to the second terminal;

wherein the terminal identifier of the first terminal carried in the first MSG4 received by the first terminal is compared with the terminal identifier of the first terminal carried in the first MSG3 sent by the first terminal, and the terminal identifier of the second terminal carried in the second MSG4 received by the second terminal is compared with the terminal identifier of the second terminal carried in the second MSG3 sent by the second terminal.

13. The device of claim 12, wherein the processor is further configured to:
in response to determining that the first time-frequency unit is parsed to obtain MSGs3 fed back by the first terminal and the second terminal respectively for the RAR, determine that the first terminal of the first terminal and the second terminal is a terminal that is succeeded in random access.

14. The device of claim 12, wherein the processor is further configured to:
receive the first MSG3 sent by the first terminal on the first time-frequency unit in a Listen Before Talk (LBT) manner.

15. The device of claim 12, wherein the terminal identifier is an International Mobile Subscriber Identification Number (IMSI) of a terminal or a random number.

16. The device of claim 12, wherein
the at least two time-frequency units are identical in frequency domain and continuous in time domain; or
the at least two time-frequency units are identical in frequency domain and discontinuous in time domain; or
the at least two time-frequency units are different in frequency domain and continuous in time domain; or
the at least two time-frequency units are different in frequency domain and discontinuous in time domain.

17. The device of claim 16, wherein the resource indication information indicates starting time-frequency positions of the at least two time-frequency units.

18. A device for random access, comprising:
a processor; and
a memory for storing processor-executable instructions;
wherein the processor is configured to implement the method of claim 7.

* * * * *